(12) United States Patent
Ambros et al.

(10) Patent No.: US 8,434,307 B2
(45) Date of Patent: May 7, 2013

(54) EXHAUST GAS SYSTEM AND METHOD FOR RECOVERING ENERGY

(75) Inventors: Peter Ambros, Kusterdingen (DE); Stefan Hildinger, Stuttgart-Vaihingen (DE); Jochen Orso, Reutlingen (DE); Klaus Tüber, Stuttgart (DE)

(73) Assignee: Modine Manufacturing Company, Racine, WI (US)

( * ) Notice: Subject to any disclaimer, the term of this patent is extended or adjusted under 35 U.S.C. 154(b) by 659 days.

(21) Appl. No.: 12/697,770

(22) Filed: Feb. 1, 2010

(65) Prior Publication Data

US 2010/0192569 A1 Aug. 5, 2010

(30) Foreign Application Priority Data

Jan. 31, 2009 (DE) .......................... 10 2009 006 959

(51) Int. Cl.
*F01K 23/10* (2006.01)

(52) U.S. Cl.
USPC ................. 60/618; 60/617; 60/605.2; 60/624

(58) Field of Classification Search ................ 60/614, 60/618, 605.2, 597, 598, 624; 701/108
See application file for complete search history.

(56) References Cited

U.S. PATENT DOCUMENTS

| | | | | |
|---|---|---|---|---|
| 6,155,042 A | * | 12/2000 | Perset et al. | 60/278 |
| 7,536,998 B2 | | 5/2009 | Held et al. | |
| 2004/0221577 A1 | * | 11/2004 | Yamaguchi et al. | 60/520 |
| 2005/0262842 A1 | * | 12/2005 | Claassen et al. | 60/618 |
| 2007/0220885 A1 | * | 9/2007 | Turner et al. | 60/605.2 |
| 2009/0020263 A1 | * | 1/2009 | Ohsawa et al. | 165/104.11 |

FOREIGN PATENT DOCUMENTS

| | | | |
|---|---|---|---|
| FR | 2913057 A1 | * | 8/2008 |
| JP | 2001132442 | | 5/2001 |
| JP | 2001132442 A | * | 5/2001 |
| WO | 2007115579 | | 10/2007 |

OTHER PUBLICATIONS

Machine Translation of JP-2001-1132442.*
Machine Translation of FR-2913057.*

* cited by examiner

*Primary Examiner* — Thomas Denion
*Assistant Examiner* — Patrick Maines
(74) *Attorney, Agent, or Firm* — Michael Best & Friedrich LLP

(57) ABSTRACT

A system and method for recovering energy from gases of an internal combustion engine in conjunction with exhaust gas recirculation is described and illustrated, and in some embodiments includes an exhaust gas recirculation valve and an exhaust gas recirculation heat exchanger, with a working medium which undergoes a cyclic process being evaporated in the exhaust gas recirculation heat exchanger by hot exhaust gases, and with resulting steam being converted into mechanical or electrical energy which is available as additional energy. To improve heat recovery with little technical expenditure, an exhaust gas control valve can interact with the exhaust gas recirculation heat exchanger, and can control the mass flow of exhaust gases flowing through the exhaust gas recirculation heat exchanger constantly in all operating phases of the internal combustion engine, approximately in the vicinity of the performance limit of energy recovery.

20 Claims, 3 Drawing Sheets

Legend

— · — · —  Cycle process
———————  Control lines V2 and V1
— — — — —  Exhaust gas
· · · · · · · · ·  HT circuit/cooling water
———————  LT circuit/cooling water
— — — — —  Mixed flow
Charge air + recirculated exhaust gas Legend — · — · — Cycle process
———— Control lines V2 and V1
— — — — Exhaust gas
· · · · · · · HT circuit/cooling water
———— LT circuit/cooling water
— · · — · · — Mixed flow
Charge air + recirculated exhaust gas Legend:

— · — · — Cycle process
────────── Control lines V2 and V1
- - - - - - Exhaust gas
· · · · · · · HT circuit/cooling water
══════════ LT circuit/cooling water
— — — — Mixed flow
Charge air + recirculated exhaust gas

EXHAUST GAS SYSTEM AND METHOD FOR RECOVERING ENERGY

CROSS-REFERENCE TO RELATED APPLICATIONS

Priority is hereby claimed to German Patent App. No. DE 10 2009 006 959.3 filed on Jan. 31, 2009, the entire contents of which are incorporated herein by reference.

BACKGROUND

There are numerous publications concerning the recovery of energy from exhaust gases, for example of an internal combustion engine. Most publications do not address exhaust gas recirculation.

In some systems, the recovery of exhaust gas energy also takes place in connection with cooled exhaust gas recirculation, which is advantageous in itself.

Corresponding concepts from the company AVL List GmbH, Austria were presented at the Truck & Bus World Forum on 8 and 9 Dec. 2008 in Göteborg, Sweden. Similar concepts and systems have also been published by Cummins Inc., USA.

However, since exhaust gas recirculation is not carried out in all operating phases of internal combustion engines, exhaust gas recirculation heat exchangers or evaporators are typically not traversed constantly by exhaust gas. This means that, in general, no recovery of energy from exhaust gases is carried out in such operating phases in which no cooled exhaust gas recirculation takes place (for example, in idle phases of the internal combustion engine).

Even though operating phases with cooled exhaust gas recirculation are considerably prevalent, there is potential for improvement with regard to recovery of exhaust gas heat energy. Energy recovery carried out during cooled exhaust gas recirculation is often not efficient enough.

SUMMARY

Systems for recovering energy from gases of an internal combustion engine in conjunction with exhaust gas recirculation are disclosed herein. In some embodiments the systems include an exhaust gas recirculation valve and an exhaust gas recirculation heat exchanger, with a working medium which undergoes a cyclic process being evaporated in the exhaust gas recirculation heat exchanger by the hot exhaust gases, and with steam being converted into mechanical or electrical energy which is available as additional energy.

Some embodiments of the present invention provide improved heat recovery in connection with exhaust gas recirculation in all operating phases of an internal combustion engine, and with little technical expenditure.

According to some embodiments of the present invention, an exhaust gas control valve interacts with an exhaust gas recirculation heat exchanger, and controls the mass flow of exhaust gases which flow through the exhaust gas recirculation heat exchanger constantly in all operating phases of an internal combustion engine, at least in the vicinity of the performance limit of possible energy recovery. The performance limit is determined by the configuration of the cycle process and/or by the configuration of components in the cycle process. For example, the performance limit can be determined by the condenser involved in the cycle process, and which must re-condense gaseous working medium. The condenser can accordingly be traversed on one side by the working medium and on the other side (for example) by a liquid low-temperature coolant.

Exhaust gas flow conducted through the evaporator or through the exhaust gas recirculation heat exchanger can be considerably greater than exhaust gas flow recirculated to the internal combustion engine for renewed combustion. It has been found that the evaporator, because it is traversed constantly by flow, is no longer subjected to such high loadings resulting from temperature fluctuation. The risk of material fracture or cracks on account of such loadings should normally decrease.

BRIEF DESCRIPTION OF THE DRAWINGS

The present invention is described in more detail below with regard to exemplary embodiments in connection with the appended three figures. Each figure is provided with a legend for clearer understanding.

FIG. 2 is an exhaust gas recirculation system according to another embodiment of the present invention.

DETAILED DESCRIPTION

Figure 1:
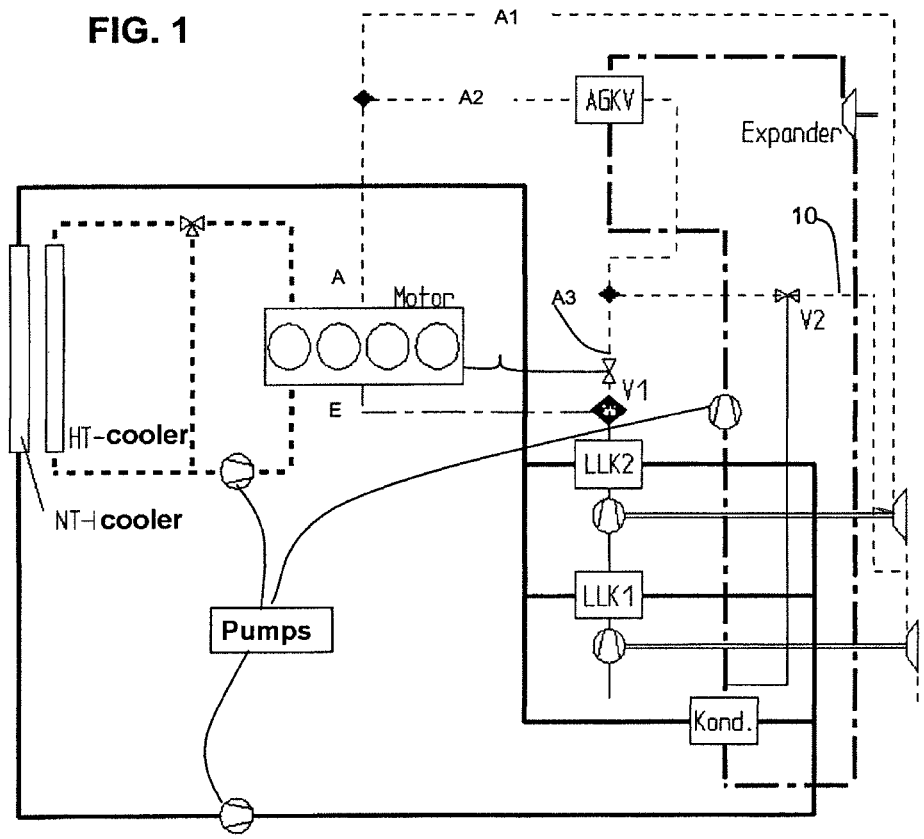
FIG. 1 is an exhaust gas recirculation system according to an embodiment of the present invention.
Figure 2:
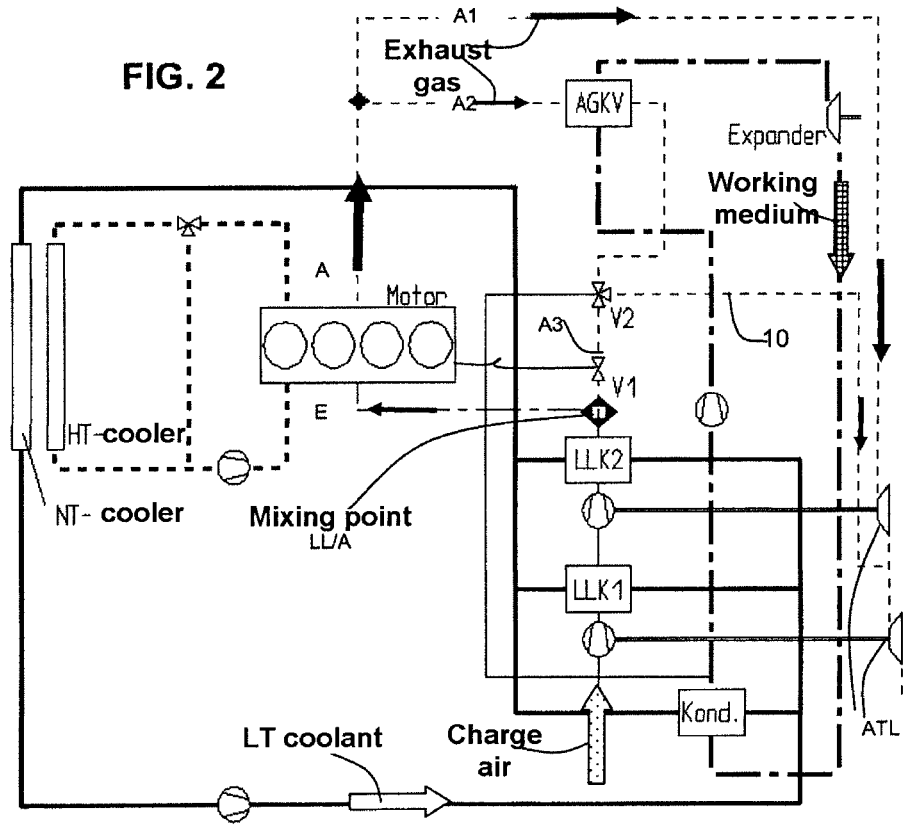
FIG. 2 also contains arrows intended to depict throughflow, and also apply to the other figures.
Figure 3:
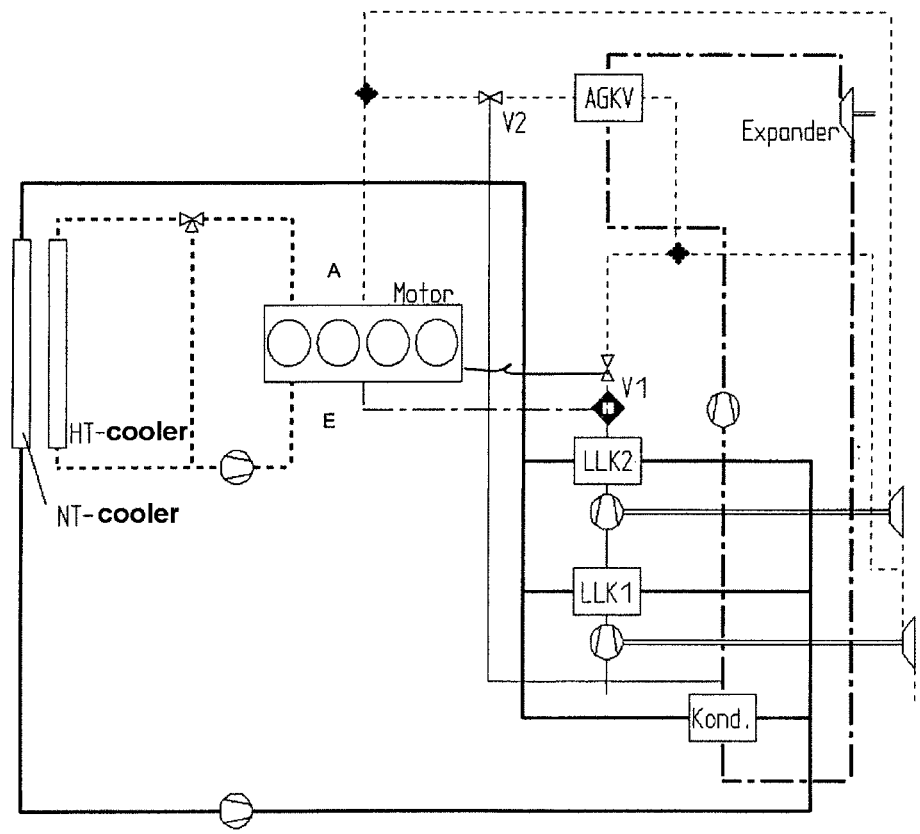
FIG. 3 is an exhaust gas recirculation system according to yet another embodiment of the present invention.

A system for recovering energy from exhaust gases of an internal combustion engine in conjunction with exhaust gas recirculation, and including an exhaust gas recirculation valve V1 and an exhaust gas recirculation heat exchanger AGKV is shown in each of FIGS. 1-3. In each embodiment, the cycle process for recovery is depicted by a dash-dotted line. A suitable working medium, for example water, refrigerant or an organic fluid, is subjected to the cycle process in each case. This working medium is evaporated in the exhaust gas recirculation heat exchanger AGKV by the hot exhaust gases (partial flow A2). The vapor is supplied to an expander, which in this case generates mechanical energy made available as additional energy (not shown). In each embodiment, the possibly already partially condensed vapor can then be condensed completely in the condenser Kond by means of an exchange of heat with a liquid coolant from a separate coolant circuit LT. The high-temperature circuit HT serves for the cooling of the internal combustion engine.

The exhaust gas recirculation heat exchanger AGKV interacts with an exhaust gas control valve V2. The exhaust gas control valve V2 ensures that a mass flow flows through the exhaust gas recirculation heat exchanger AGKV in all operating phases of the internal combustion engine. The exhaust gas control valve V2 in the exemplary embodiments shown receives signals, for example relating to the temperature and/or pressure of the working medium in the state after leaving the condenser Kond. Certain values of the temperature and/or pressure define the performance limits which can be realized in the cycle process of energy recovery. A mass flow of the exhaust gases A2 which is greater than that required for the exhaust gas recirculation A3 is conducted through the exhaust gas recirculation heat exchanger AGKV at all times. The exhaust gas recirculation valve V1 is controlled on the basis of engine-specific characteristic values. For example, the exhaust gas recirculation valve V1 is closed at idle, at low load of the engine, or at low ambient temperatures, while the exhaust gas recirculation valve V1 is open or at least partially open in other operating phases.

Compressed charge air LL is also cooled by means of the above-mentioned low-temperature coolant circuits LT illustrated in FIGS. 1-3. The exemplary embodiments show two-stage charge air cooling in LLK 1 and LLK 2, in conjunction with a two-stage exhaust gas turbocharger ATL1 and ATL2. The exhaust gas turbocharger ATL1 and ATL2 is driven by a partial flow A1 of the exhaust gases, and makes available compressed charge air LL, which is subsequently subjected to the cooling. The cooled charge air is mixed with the recirculated, cooled exhaust gas A3 at a mixing point, and is introduced on the inlet side E of the internal combustion engine, into the cylinders of the engine E.

In some embodiments, the exhaust gas partial flow A2 is greater than in the prior art, while the proportional flow A1 is correspondingly smaller. Arranged downstream of the exhaust gas recirculation heat exchanger AGKV is a branch line 10 which supplies exhaust gas A which has been utilized for energy recovery but which cannot be used for exhaust gas recirculation, to the exhaust gas turbocharger ATL. The exhaust gas A leaving the exhaust gas turbocharger ATL can expediently likewise be used in the cycle process for energy recovery, which is not shown here.

In the embodiments of FIGS. 2 and 3, the exhaust gas control valve V2 is arranged upstream of the exhaust gas recirculation valve V1 (as viewed in the flow direction of the exhaust gases), whereas in the embodiment of FIG. 1, the two valves V1 and V2 are arranged so as to lie in parallel. Here, in structural terms, the two valves V1 and V2 may be combined to form a valve unit with corresponding line connections. In the exemplary embodiment of FIG. 1, however, the exhaust gas control valve V2 has been arranged in the branch line 10, and the exhaust gas recirculation valve V1 is located upstream of the charge air/exhaust gas mixing point. In contrast, in FIG. 2, the exhaust gas control valve V2 is located at the point of intersection of the branch line 10. In the exemplary embodiment of FIG. 3, the exhaust gas control valve V2 is in contrast located upstream of the exhaust gas recirculation heat exchanger AGKV. The exhaust gas control valve V2 is open in all operating phases of the engine, and varies only its degree of opening corresponding to the maximum possible recovery rate.

During a start of the internal combustion engine, the exhaust gas control valve V2 has a degree of opening of, for example, 50-60%, while the exhaust gas recirculation valve V1 is closed. Exhaust gas is cooled by the working medium from the cycle process in the exhaust gas recirculation heat exchanger AGKV, with the working medium being evaporated. The resulting vapor generates energy. Later, the exhaust gas recirculation valve V1 is opened in a stepped fashion in order that exhaust gas recirculation can be carried out. The system registers that less exhaust gas is available for energy recovery, and thereupon increases the degree of opening of the exhaust gas control valve V2 to, for example, 80-90%, in order that both exhaust gas required for exhaust gas recirculation and also exhaust gas required for energy recovery is available. Further interaction and control by, for example, a further control line and an electronic controller between the valves V1 and V2 and/or between the internal combustion engine and the cycle process, may also be required for this purpose (not shown).

The embodiments of the present invention described above and illustrated in the accompanying figures are presented by way of example only, and are not intended as a limitation upon the concepts and principles of the present invention. As such, it will be appreciated by one having ordinary skill in the art that various changes in the elements and their configuration and arrangement are possible without departing from the spirit and scope of the present invention.

What is claimed is:

1. A system for recovering energy from gases of an internal combustion engine having exhaust gas recirculation, the system comprising:
    an exhaust gas recirculation valve;
    an exhaust gas recirculation heat exchanger configured to receive hot exhaust gases from the internal combustion engine and connected to the exhaust gas recirculation valve, the exhaust gas recirculation heat exchanger operable to evaporate a working medium and to produce steam by heat transfer with the hot exhaust gases;
    a condenser connected to the exhaust gas recirculation heat exchanger to receive the working medium; and
    an exhaust gas control valve interacting with the exhaust gas recirculation heat exchanger to control a mass flow of exhaust gases from the internal combustion engine that flows through the exhaust gas recirculation heat exchanger, and to provide exhaust gases flowing constantly through the exhaust gas recirculation heat exchanger during all operating phases of the internal combustion engine;
    wherein the exhaust gas control valve is coupled to the condenser to receive signals from the condenser relating to at least one of temperature and pressure of the working medium leaving the condenser.

2. The system of claim 1, wherein the exhaust gas control valve is located upstream of the exhaust gas recirculation valve with respect to flow direction of exhaust gases in the system.

3. The system of claim 2, wherein the exhaust gas control valve controls the mass flow of exhaust gases upstream of the exhaust gas recirculation heat exchanger, and wherein the exhaust gas recirculation valve controls recirculated exhaust gas flow downstream of the exhaust gas recirculation heat exchanger.

4. The system of claim 3, wherein non-recirculated exhaust gas is fed downstream of the exhaust gas heat exchanger and to exhaust gas flow via a branch line at a location that is at least one of upstream and downstream of a first exhaust gas turbine.

5. The system of claim 3, wherein a portion of the entire exhaust gas flow from the internal combustion engine is conducted through the exhaust gas heat exchanger, and wherein the portion is greater than another portion of the entire exhaust gas flow recirculated to the internal combustion engine.

6. The system of claim 2, wherein both recirculated exhaust gas flow and exhaust gas flow serving for energy recovery are controlled downstream of the exhaust gas recirculation heat exchanger.

7. The system of claim 6, wherein non-recirculated exhaust gas is fed downstream of the exhaust gas heat exchanger and to exhaust gas flow via a branch line at a location that is at least one of upstream and downstream of a first exhaust gas turbine.

8. The system of claim 6, wherein a portion of the entire exhaust gas flow from the internal combustion engine is conducted through the exhaust gas heat exchanger, and wherein the portion is greater than another portion of the entire exhaust gas flow recirculated to the internal combustion engine.

9. The system of claim 2, wherein non-recirculated exhaust gas is fed downstream of the exhaust gas heat exchanger and to exhaust gas flow via a branch line at a location that is at least one of upstream and downstream of a first exhaust gas turbine.

10. The system of claim 9, wherein a portion of the entire exhaust gas flow from the internal combustion engine is conducted through the exhaust gas heat exchanger, and wherein the portion is greater than another portion of the entire exhaust gas flow recirculated to the internal combustion engine.

11. The system of claim 2, wherein a portion of the entire exhaust gas flow from the internal combustion engine is conducted through the exhaust gas heat exchanger, and wherein the portion is greater than another portion of the entire exhaust gas flow recirculated to the internal combustion engine.

12. The system of claim 1, wherein the exhaust gas control valve controls the mass flow of exhaust gases upstream of the exhaust gas recirculation heat exchanger, and wherein the exhaust gas recirculation valve controls recirculated exhaust gas flow downstream of the exhaust gas recirculation heat exchanger.

13. The system of claim 12, wherein non-recirculated exhaust gas is fed downstream of the exhaust gas heat exchanger and to exhaust gas flow via a branch line at a location that is at least one of upstream and downstream of a first exhaust gas turbine.

14. The system of claim 12, wherein a portion of the entire exhaust gas flow from the internal combustion engine is conducted through the exhaust gas heat exchanger, and wherein the portion is greater than another portion of the entire exhaust gas flow recirculated to the internal combustion engine.

15. The system of claim 1, wherein both recirculated exhaust gas flow and exhaust gas flow serving for energy recovery are controlled downstream of the exhaust gas recirculation heat exchanger.

16. The system of claim 15, wherein non-recirculated exhaust gas is fed downstream of the exhaust gas heat exchanger and to exhaust gas flow via a branch line at a location that is at least one of upstream and downstream of a first exhaust gas turbine.

17. The system of claim 15, wherein a portion of the entire exhaust gas flow from the internal combustion engine is conducted through the exhaust gas heat exchanger, and wherein the portion is greater than another portion of the entire exhaust gas flow recirculated to the internal combustion engine.

18. The system of claim 1, wherein non-recirculated exhaust gas is fed downstream of the exhaust gas heat exchanger and to exhaust gas flow via a branch line at a location that is at least one of upstream and downstream of a first exhaust gas turbine.

19. The system of claim 18, wherein a portion of the entire exhaust gas flow from the internal combustion engine is conducted through the exhaust gas heat exchanger, and wherein the portion is greater than another portion of the entire exhaust gas flow recirculated to the internal combustion engine.

20. The system of claim 1, wherein a portion of the entire exhaust gas flow from the internal combustion engine is conducted through the exhaust gas heat exchanger, and wherein the portion is greater than another portion of the entire exhaust gas flow recirculated to the internal combustion engine.

* * * * *